(12) United States Patent
Jones et al.

(10) Patent No.: US 10,046,861 B2
(45) Date of Patent: Aug. 14, 2018

(54) AIRCRAFT SAFETY DEVICE SYSTEMS

(71) Applicants: Richard Jones, Decatur, AL (US);
Terrell Jones, Decatur, AL (US)

(72) Inventors: Richard Jones, Decatur, AL (US);
Terrell Jones, Decatur, AL (US)

(*) Notice: Subject to any disclaimer, the term of this patent is extended or adjusted under 35 U.S.C. 154(b) by 23 days.

(21) Appl. No.: 15/080,300

(22) Filed: Mar. 24, 2016

(65) Prior Publication Data
US 2016/0200445 A1 Jul. 14, 2016

Related U.S. Application Data

(63) Continuation-in-part of application No. 13/304,212, filed on Nov. 23, 2011, now abandoned.

(51) Int. Cl.
*B64D 33/02* (2006.01)
*F02C 7/055* (2006.01)

(52) U.S. Cl.
CPC ............ *B64D 33/02* (2013.01); *F02C 7/055* (2013.01); *B64D 2033/022* (2013.01); *B64D 2033/0286* (2013.01)

(58) Field of Classification Search
CPC ............ F02C 7/055; B64D 2033/022; F05D 2260/607
See application file for complete search history.

(56) References Cited

U.S. PATENT DOCUMENTS

| | | | | |
|---|---|---|---|---|
| 2,944,631 A * | 7/1960 | Kerry et al. | ................ | 55/306 |
| 3,121,545 A * | 2/1964 | Meletion | .................. | 244/53 B |
| 4,149,689 A * | 4/1979 | McDonald | ............... | 244/53 B |
| 2010/0270427 A1* | 10/2010 | Barrientos et al. | ......... | 244/1 R |
| 2010/0284791 A1* | 11/2010 | Flores | ...................... | 415/121.2 |
| 2011/0011055 A1* | 1/2011 | Troy | ........................ | 60/39.092 |
| 2011/0179765 A1* | 7/2011 | Lalli | ........................ | 60/39.093 |
| 2011/0185700 A1* | 8/2011 | Newcomer | ............... | 60/39.092 |

* cited by examiner

*Primary Examiner* — Carlos A Rivera
(74) *Attorney, Agent, or Firm* — RG Patent Consulting, LLC; Rachel Gilboy

(57) ABSTRACT

An aircraft system comprising a deflector assembly including, a base having mounting apertures; an inner ring concentrically positioned within an outer ring, the inner ring and the outer ring have an annulus defined therebetween via a base plate, a plurality of rods attached within the annulus and culminating at an apex creating a conical profile; and a forward-mounted cone-shaped deflecting member. The base plate comprises a through hole allowing airflow through the deflector assembly to supply an airplane engine. The aircraft safety device system further comprises at least one locking latch for removably securing the deflector assembly to a housing of the airplane engine. The aircraft safety device is mountable inside a lip of the housing of the airplane engine. Further, the aircraft safety device provides protection for airplane engines from air born animate and inanimate objects.

14 Claims, 7 Drawing Sheets

AIRCRAFT SAFETY DEVICE SYSTEMS

CROSS-REFERENCE TO RELATED APPLICATION

The present application is related to and claims priority from prior provisional application Ser. No. 61/416,334, filed Nov. 23, 2010, and Ser. No. 13/304,212, filed on Nov. 23, 2011, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of devices aircraft engine protection and more specifically relates to a device used for obstructing the entry of birds and other foreign objects into aircraft jet engines.

2. Description of the Related Art

Airplanes are used in modern society to efficiently transport individuals between locations. Airplane accidents may be caused by collisions with birds and other air-born objects. A risk of engine damage exists when a bird's flight path intersects with that of an airplane. Birds often migrate to suit the climate they can best survive in. Often birds migrate in flocks such that they may be difficult to avoid. The bird(s) may get pulled into the engine turbine from the tremendous vacuum forces of the air being sucked into the turbines or propellers. This may cause serious damage to the engine, an extreme expense and potentially may result in the airplane crashing. Airplane crashes may be dangerous to human passengers. Further, investigations and law suits brought about by crashed may also be expensive and a large burden on various agencies.

The aerospace industry may be required to spend extremely large sums of money each year in direct costs, such as engine and maintenance repairs. Other exorbitant amounts of money may be funneled into indirect costs, such as delays, aircraft changes, fuel costs, and unscheduled maintenance. Airplane engines can incur significant damage while in operation. Birds, dust, hail, and other items and elements may fly into engines, creating obstructions that prevent the engines from functioning. This can lead to mid-flight engine failure, which may result in crashes, injured passengers, lost lives, and large direct and indirect fees. A feasible solution is needed.

Various attempts have been made to solve the above-mentioned problems such as those found in U.S. Pat. And Pub. Nos. U.S. Pat. No. 4,833,879, U.S. Pat. No. 2,931,460, U.S. Pat. No. 6,089,824, U.S. Pat. No. 4,077,739, U.S. Pat. No. 6,138,950, U.S. Pat. No. 3,426,981, U.S. Pat. No. 3,302,395, U.S. Pat. No. 6,598,384, 2010/0270427; U.S. Pat. Nos. 3,121,545, 5,411,224, 2,553,512, 2,928,497, 3,871,844, 4,149,689, and 7,803,204. This prior art is representative of protective deflectors for airplane engines. None of the above inventions and patents, taken either singly or in combination, is seen to describe the invention as claimed.

Ideally, an aircraft safety device system should require minimal maintenance, not dramatically impede airflow through the turbine(s) and/or propeller and yet, operate reliably and be manufactured at a modest expense. Thus, a need exists for an aircraft safety device to deflect birds, objects, and other debris thereby preventing damage from occurring to airplane engines and to avoid the above-mentioned problems.

BRIEF SUMMARY OF THE INVENTION

In view of the foregoing disadvantages inherent in the known aircraft accessory art, the present invention provides a novel aircraft safety device system. The general purpose of the present invention, which will be described subsequently in greater detail is to provide protection for airplane engines from air born animate and inanimate objects. Air Craft Safety Device is designed to protect an airplane engine in order to prevent mid-flight engine failure. Using this device may drastically reduce necessary repair costs, and may also reduce the risk of engine failure, crashes, and subsequent injuries and deaths.

The present invention, aircraft safety device system, as disclosed herein, preferably comprises: a deflector assembly including, a base having mounting apertures; an inner ring concentrically positioned within an outer ring. The inner ring and the outer ring preferably have an annulus defined therebetween via a base plate, a plurality of rods attached within the annulus and culminating at an apex creating a conical profile; and a forward-mounted cone-shaped deflecting member (resembling a profile of a bullet.) The base plate comprises a (center) through hole allowing airflow through the deflector assembly to supply an airplane engine. The aircraft safety device system further comprises at least one locking latch in preferred embodiments for removably securing the deflector assembly to a housing of the airplane engine. The aircraft safety device may be mountable inside a lip of the housing of the airplane engine, and other versions may be mounted on the exterior.

The forward-mounted cone-shaped deflecting member is mounted forward of and atop the apex of the plurality of rods. The plurality of rods may be weld-affixed to the base. Further, the plurality of rods provide a structural re-enforcement for the forward-mounted cone-shaped deflecting member such that the deflector assembly is able to serve as the aircraft safety device to deflect-prevent birds and debris from contacting and compromising the airplane engine.

The forward-mounted cone-shaped deflecting member is removable for cleaning and maintenance of the airplane engine. The forward-mounted cone-shaped deflecting member comprises an aerodynamic-projectile-profile. The aerodynamic-projectile-profile comprises a forward-facing-apex, comprising a wind-sheer. The forward-mounted cone-shaped deflecting member is non-rotating. The conical profile provides a convex screen-framework whereby debris is prevented from entering a turbine of the airplane engine. The conical profile provides a screen-framework having force directing members wherein wind force is directed from the forward-mounted cone-shaped deflecting member to the base. The base serves to support all components located in front of it.

A method of using an aircraft safety device is disclosed herein preferably comprising the steps of: installing an aircraft safety device in a coupled relationship to a housing of an airplane engine air-intake opening; flying an airplane using the aircraft safety device to prevent birds and debris from entering the airplane engine; removing the aircraft safety device from a lip of the housing of the airplane engine via unlatching a lockable latch to perform at least one maintenance service on the airplane engine; and optionally swinging the aircraft safety device to a side of the housing of the airplane engine such that the airplane engine is able to be serviced.

The present invention holds significant improvements and serves as aircraft safety device systems. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, aircraft safety device systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a field of devices for obstructing the entry of birds and other foreign objects into aircraft jet engines and more specifically relates to a screen of convex rods used to deflect foreign objects from the air intake of a turbine engine.

As discussed previously, a risk of engine damage exists when a foreign object's path intersects with that of an airplane. The foreign object may get pulled into the engine turbine from the tremendous force of the air being 'sucked' inwardly and may lead to serious damage to the engine. Such damage may result in a catastrophic airplane crash. This is a serious problem that plagues the aviation industry. The safety of an airplane engine during flight is of utmost concern and requires the ultimate standard of care, as modern technology permits, in protecting the integrity and stability of the aircraft and the lives of the passengers onboard. Further, it is of concern that birds and other wildlife are protected from harm. The present invention serves to solve these and other related problems as disclosed herein.

Figure 1:
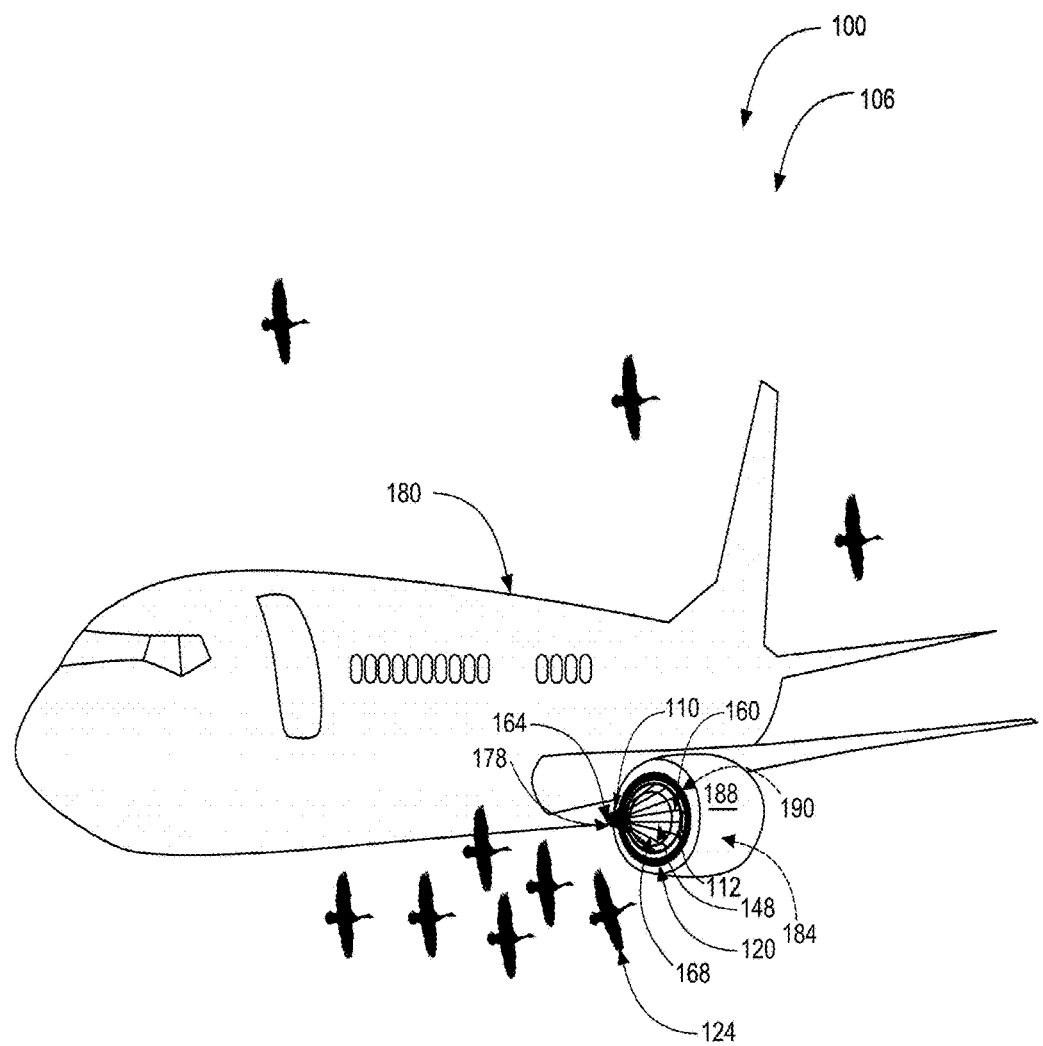
FIG. 1 shows a perspective view illustrating aircraft safety device systems in an 'in-use' condition according to an embodiment of the present invention.
Figure 2:
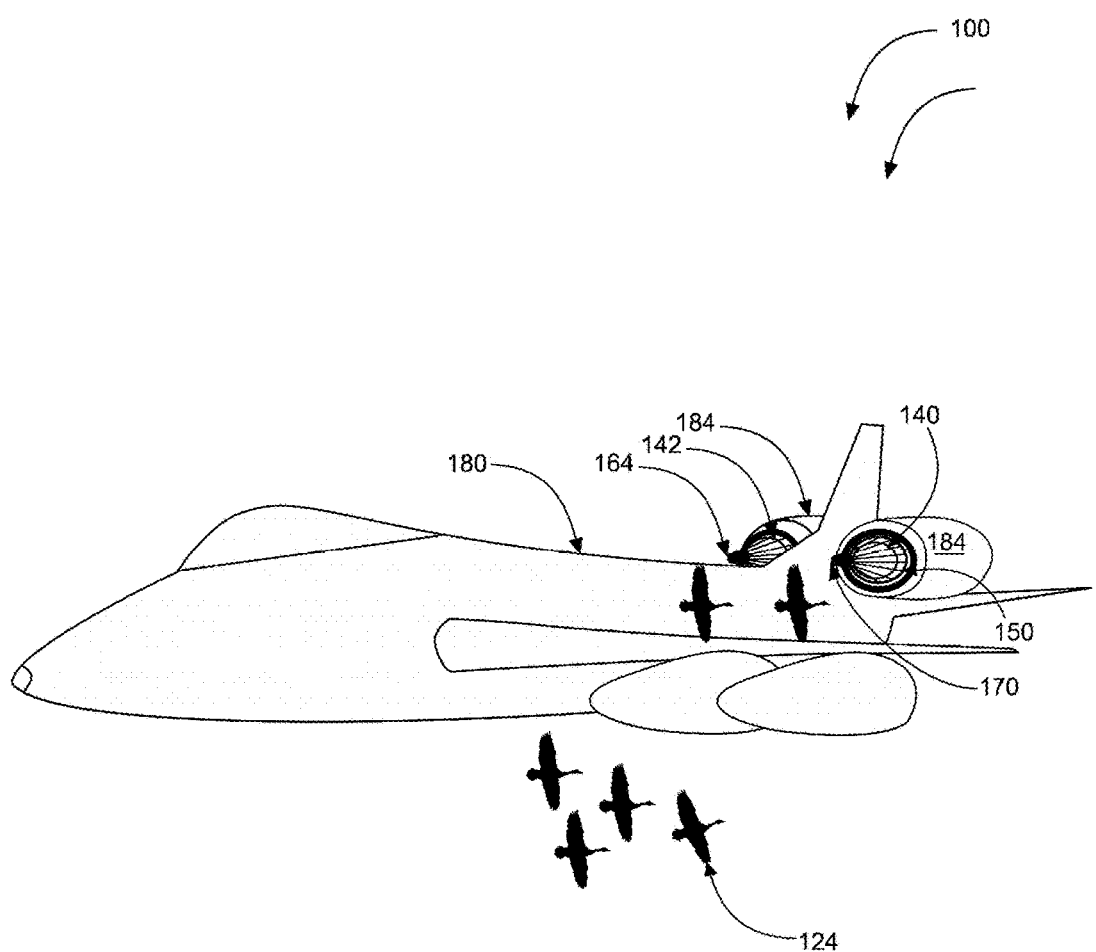
FIG. 2 shows a perspective view illustrating aircraft safety device systems in another 'in-use' condition according to an embodiment of the present invention of FIG. 1.

Referring to the drawings by numerals of reference there is shown in FIGS. 1 & 2 airplane safety device systems 100 in in-use conditions 106 and 206, respectively, according to an embodiment of the present invention. Airplane engine deflector system 100 may generally comprise deflector assembly 110 that may be securably installed to engine 184 of airplane 180 to deflect birds 124 and other substantial debris from entering into and interfering with performance of engine 184. As illustrated the present invention may be for use on various models of airplanes 180.

In a preferred embodiment of the deflector assembly 110 of airplane safety device systems 100 preferably includes base 120, having an outer diameter OD1 of 73.82 inches and an inner diameter ID2 of 55.38 inches, and having mounting apertures 130; inner ring 140, having an outer diameter OD2 of 63.1 inches, an inner diameter ID2 of 55.38 inches, and a thickness of 3.94 inches, preferably concentrically positioned within outer ring 150, having an outer diameter OD1 of 73.82 inches, an inner diameter ID1 of 66.1 inches, and a thickness of 3.94 inches; plurality of rods 160, having lengths of 72.01 inches and uniform diameters of 0.787 inches; and forward-mounted cone-shaped deflecting member 170. Inner ring 140 and outer ring 150 and base plate 144 form an annulus 142 defined therebetween having a width of 3 inches. Base plate 144 preferably comprises (center) through-hole 148 having a diameter of 55.38 inches allowing airflow through deflector assembly 110 to supply engine 184 of airplane 180. Rods 160 are attached to an inner surface forming annulus 142, in a fashion known in the art, and culminate at apex 164 thereby creating conical profile 168. Conical profile 168 comprises a convex orientation in relation to engine 184 and forms a total horizontal length of 68.96 inches. It is important to note that the base 120, the inner ring 130, the outer ring 140, and annulus 142 form a geometry that is very strong and rigid, such that when the rods 160 are connected between the cone ring 175 and an inner surface forming said annulus 142 the resulting structure is strong enough to withstand wind pressures and bird strikes without any permanent deformation.

Forward-mounted cone-shaped deflecting member 170 is preferably stationary and mounted forward of and atop apex 164 of rods 160. Cone ring member 175 has dimensions including an outer diameter OD3 of 9.25 inches, an inner diameter ID3 of 5.91 inches, and a thickness of 3.94 inches. Rods 160 are connected thereto and provide a structural re-enforcement for forward-mounted cone-shaped deflecting member 170 such that deflector assembly 110 is able to serve as aircraft safety device system 100 to deflect-prevent birds and debris from contacting and compromising engine 184 of airplane 180. As shown in in-use condition 206 of FIG. 2, forward-mounted cone-shaped deflecting member 170 may be non-rotating, however forward-mounted cone-shaped deflecting member 170 may rotate as shown in in-use condition 106 of FIG. 1. Forward-mounted cone-shaped deflecting member 170 and plurality of rods 160 comprise redundant object deflecting means in that if one or the other fails to function the other deflects the bird or the like; however they are designed to work in conjunction with each other for optimum results.

Figure 3:
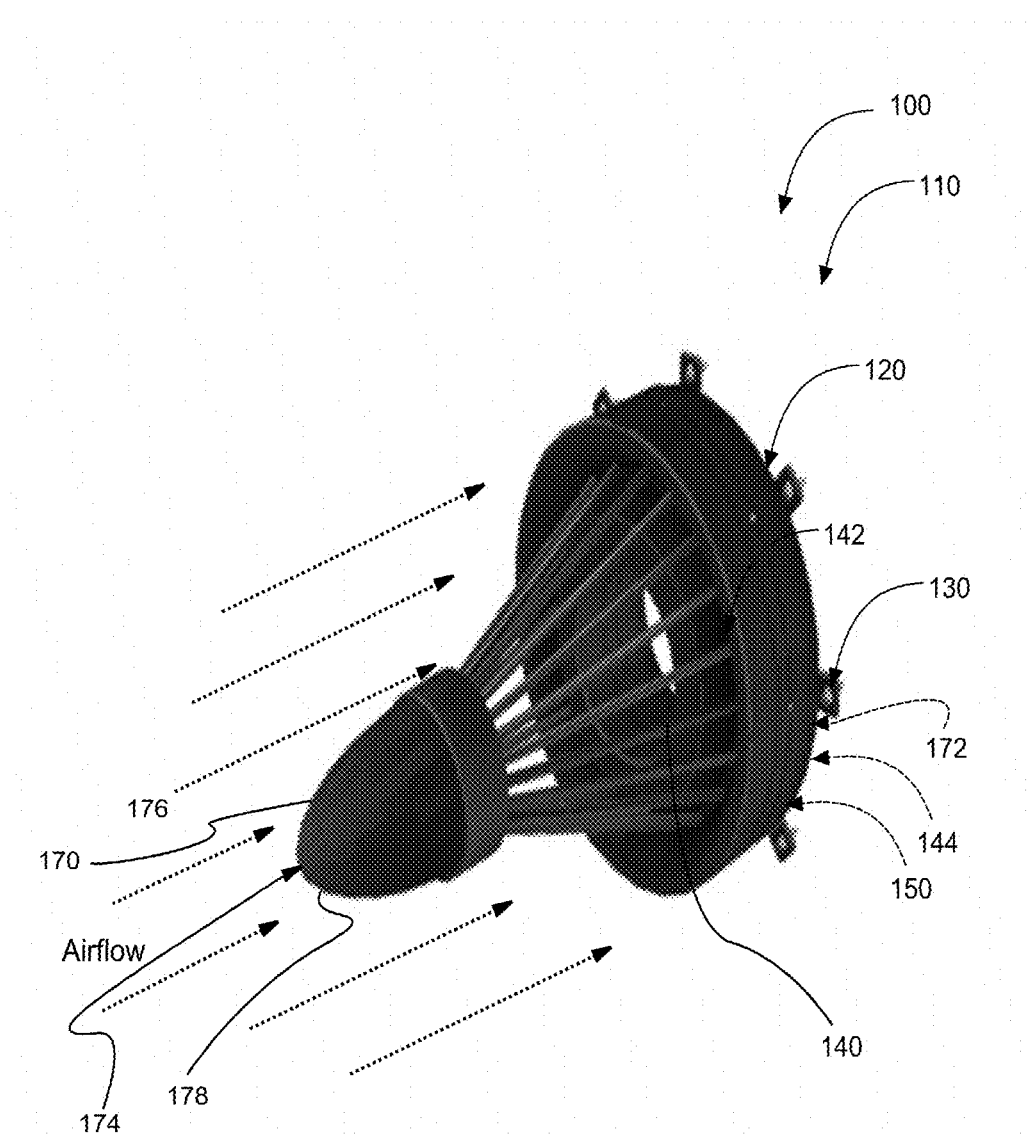
FIG. 3 shows a perspective view illustrating a deflector assembly of the aircraft safety device systems according to an embodiment of the present invention of FIG. 1.

Referring now to FIG. 3 shows a perspective view illustrating deflector assembly 110 of aircraft safety device systems 100 according to an embodiment of the present invention of FIG. 1.

Forward-mounted cone-shaped deflecting member 170 is preferably removable for cleaning and maintenance of engine 184 of airplane 180. Forward-mounted cone-shaped deflecting member 170 comprises aerodynamic-projectile-profile 174 and has a length along the axis of the deflector assembly of 24.6 inches. Aerodynamic-projectile-profile 174 of forward-mounted cone-shaped deflecting member 170 comprises wind-sheer 176 and forward-facing-apex 178. Forward-mounted cone-shaped deflecting member 170 further comprises base ring 172.

Conical profile 168 preferably provides a convex screen-framework whereby debris is effectively prevented from entering a propeller of engine 184 of airplane 180. Further, conical profile 168 provides a screen-framework having force directing members wherein wind force is directed from forward-mounted cone-shaped deflecting member 170 to base 120. Base 120 may comprise lugs having mounting apertures 130. Mounting apertures 130 are preferably able to receive at least one fastener. Rods 160 may be weld-affixed to base 120 or in other embodiments rods 160 may be integral with base 120 (in a single casting manufacture.) Upon reading this specification, it should be appreciated that, under appropriate circumstances, considering such issues as user preferences, design preference, structural requirements, marketing preferences, cost, available materials, technological advances, etc., other fastening arrangements for rods to base such as, for example, using fastening means, other equivalent forms of manufacture, etc., may be sufficient.

Figure 4:
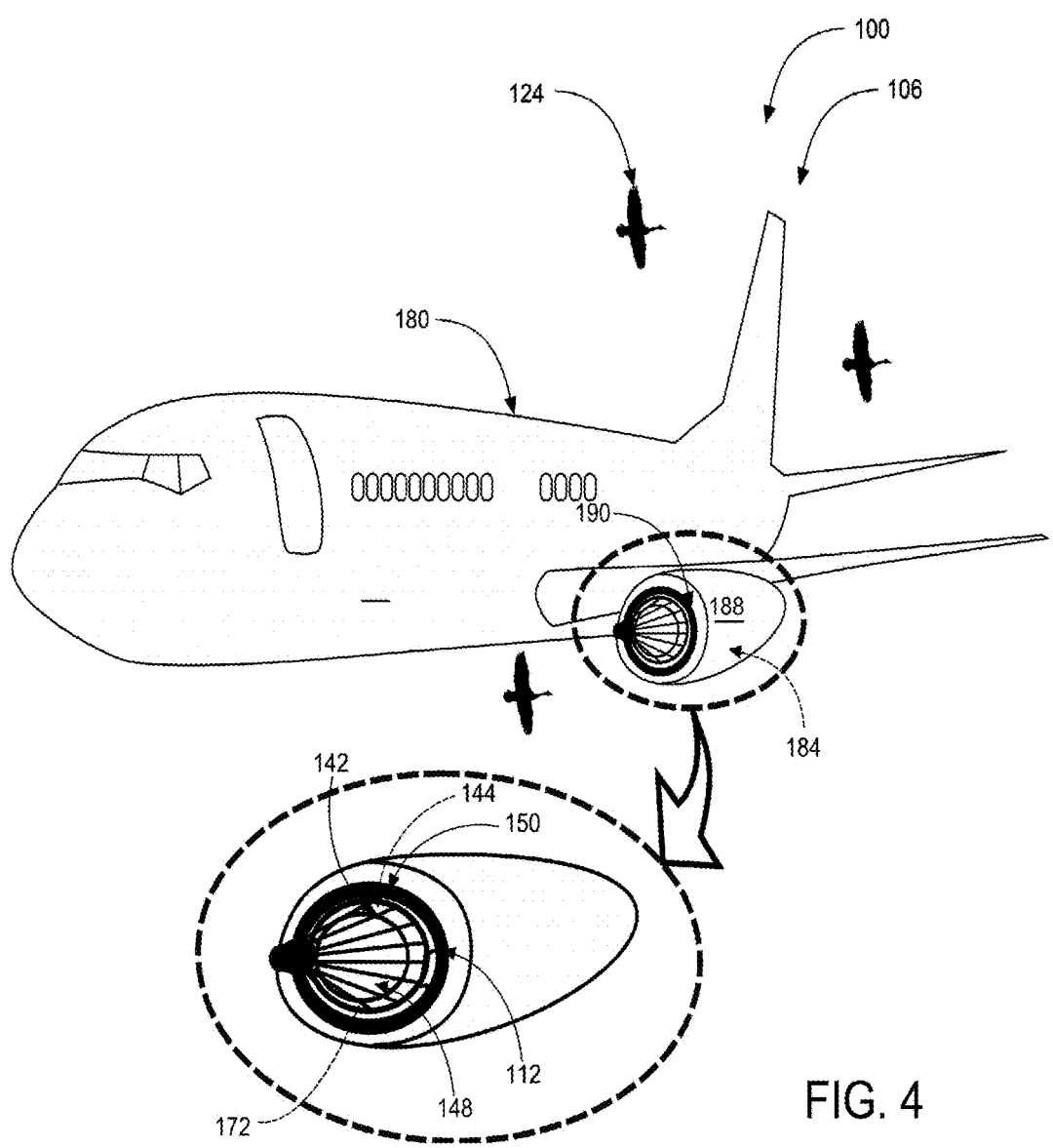
FIG. 4 shows an exploded perspective view illustrating another view of the deflector assembly of the aircraft safety device systems according to an embodiment of the present invention of FIG. 1.

FIG. 4 shows an exploded perspective view illustrating another view of deflector assembly 110 of aircraft safety device systems 100 according to an embodiment of the present invention of FIG. 1.

Deflector assembly 110 of aircraft safety device systems 100 further comprises at least one locking latch 112 in preferred embodiments for removably securing deflector assembly 110 to housing 188 of engine 184 of airplane 180. Aircraft safety device systems 100 is preferably mountable inside lip 190 of housing 188 of engine 184 of airplane 180. Deflector assembly 110 of aircraft safety device systems 100 may be mountable external to housing 188 of engine 184 of airplane 180. Much like performing any other maintenance tasks on airplane 180, it is highly important that aircraft safety device systems 100 be properly approved, maintained and tested. When installing deflector assembly 110 to engine 184 of airplane 180, locking latch 112 must be locked for securing deflector assembly 110 to housing 188 of engine 184 of airplane 180 for safe and proper use. Locking latch 112 preferably use camming means for gradual tightening; however other suitable fastening means may be suitable. Additionally locking latches 112 may be hinged such that they may be opened from the front or side of housing 188 of engine 184.

Figure 5:
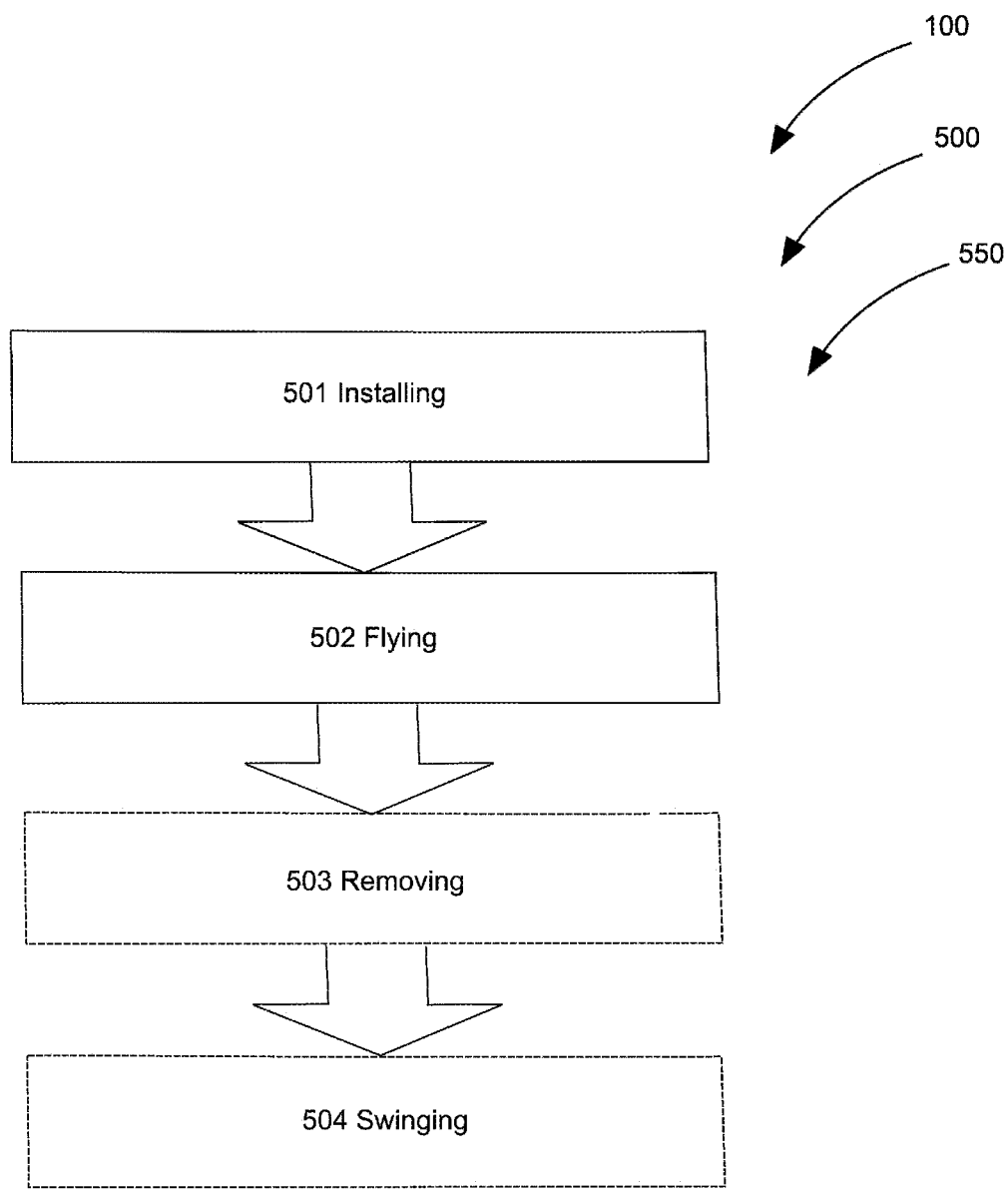
FIG. 5 is a flowchart illustrating a method of use for the deflector assembly of the aircraft safety device systems according to an embodiment of the present invention of FIGS. 1-4.
Figure 6:
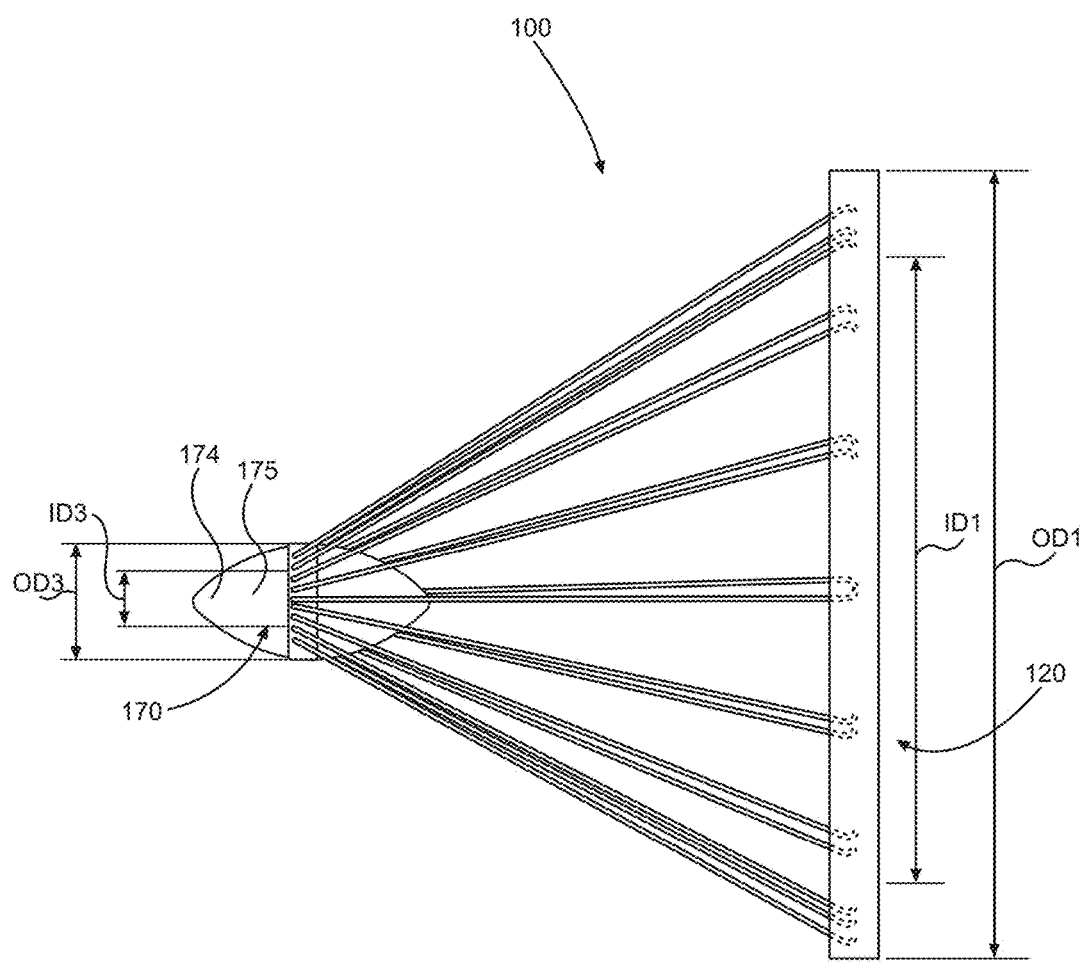
FIG. 6 shows a side view illustrating a deflector assembly of the aircraft safety device systems according to an embodiment of the present invention of FIG. 1.
Figure 7:
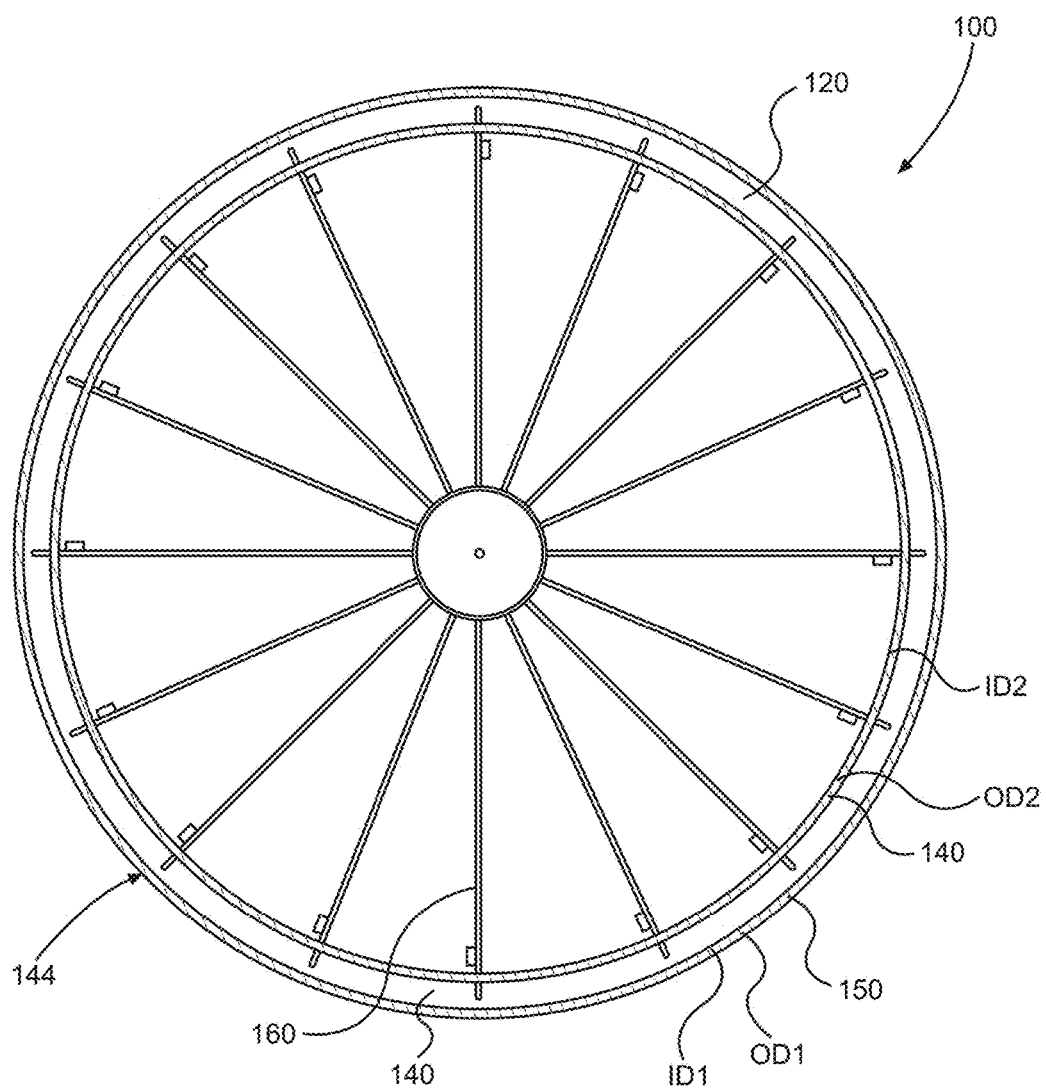
FIG. 7 shows a front view illustrating a deflector assembly of the aircraft safety device systems according to an embodiment of the present invention of FIG. 1.

Referring now to FIG. 5, showing flowchart 550 illustrating method of use 500 for aircraft safety device systems 100 according to an embodiment of the present invention of FIGS. 1-4.

A method of using (at least herein enabling method of use 500) aircraft safety device systems 100 may comprise the steps of: step one 501 installing (via locking latches 112) aircraft safety device systems 100 in a coupled relationship to housing 188 of an airplane engine air-intake opening; step two 502 flying airplane 180 using aircraft safety device systems 100 to prevent birds and debris from entering engine 184 of airplane 180; step three 503 removing aircraft safety device systems 100 from lip 190 of housing 188 of engine 184 of airplane 180 via unlatching locking latch 112 to perform at least one maintenance service on engine 184 of airplane 180; and step four 504 optionally swinging aircraft safety device systems 100 to a side of housing 188 of engine 184 of airplane 180 such that engine 184 of airplane 180 is able to be serviced.

It should be noted that this device can be proportionally made in different sizes for different sized aircraft engines.

It should be noted that steps 503 and 504 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, proportional resizing, and variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An aircraft safety device comprising:
  a deflector assembly including,
    a base having mounting apertures, said base including;
      a base plate; and
      an inner ring mounted on said base plate and concentrically positioned within an outer ring that is also mounted on said base plate, said inner ring and said outer ring forming an annulus therebetween and upon said base plate;
    a plurality of rods securely attached to a surface defining said annulus and culminating at an apex creating a conical profile;

a stationary forward-mounted cone-shaped deflecting member;

wherein said base plate has a substantially circular shape having an outer diameter and comprises a through hole having a substantially circular shape having a diameter and allowing airflow through said deflector assembly to supply an airplane engine, wherein said through hole diameter is about three-fourths said base plate outer diameter;

wherein said annulus is formed having a width between 2 and 6 inches;

wherein said stationary forward-mounted cone-shaped deflecting member is mounted forward of and atop said apex of said plurality of rods; and wherein said base plate, said through hole, said inner ring, said outer ring, and said annulus are formed and shaped to provide a rigid, strong, and secure mounting surface for said plurality of rods; and wherein said plurality of rods provide a rigid, strong, and secure structural re-enforcement for said stationary forward-mounted cone-shaped deflecting member such that said deflector assembly is able to serve as said aircraft safety device to deflect-prevent birds and debris from contacting and compromising said airplane engine.

2. The aircraft safety device of claim 1 further comprising at least one locking latch for removably securing said deflector assembly to a housing of said airplane engine.

3. The aircraft safety device of claim 1 wherein said stationary forward-mounted cone-shaped deflecting member is removable for cleaning and maintenance of said airplane engine.

4. The aircraft safety device of claim 1 wherein said stationary forward-mounted cone-shaped deflecting member comprises an aerodynamic-projectile-profile.

5. The aircraft safety device of claim 4 wherein said conical profile provides a screen-framework whereby debris is prevented from entering a propeller of said airplane engine.

6. The aircraft safety device of claim 4 wherein said conical profile provides a screen-framework whereby debris is prevented from entering a turbine of said airplane engine.

7. The aircraft safety device of claim 1 wherein said plurality of rods are weld-affixed to said base.

8. The aircraft safety device of claim 1 wherein said plurality of rods are integral with said base.

9. The aircraft safety device of claim 4 wherein said aerodynamic-projectile-profile comprises a forward-facing-apex.

10. The aircraft safety device of claim 9 wherein said stationary forward-mounted cone-shaped deflecting member is non-rotating.

11. The aircraft safety device of claim 1 wherein said stationary forward-mounted cone-shaped deflecting member comprises a base ring.

12. The aircraft safety device of claim 1 wherein said base comprises lugs having said mounting apertures, said mounting apertures able to receive at least one fastener.

13. The aircraft safety device of claim 2 wherein said aircraft safety device is mountable external to said housing of said airplane engine.

14. The aircraft safety device of claim 2 wherein said aircraft safety device is mountable inside a lip of said housing of said airplane engine.

* * * * *